US010301217B2

(12) United States Patent
Hill et al.

(10) Patent No.: US 10,301,217 B2
(45) Date of Patent: May 28, 2019

(54) RAPID SETTING MATERIAL FOR IMPROVED PROCESSING AND PERFORMANCE OF CARBONATING METAL SILICATE CEMENT

(71) Applicants: Boral IP Holdings (Australia) PTY Limited, North Sydney, New South Wales (AU); Russell L. Hill, San Antonio, TX (US); Amitabha Kumar, San Antonio, TX (US)

(72) Inventors: Russell L. Hill, San Antonio, TX (US); Amitabha Kumar, San Antonio, TX (US)

(73) Assignee: BORAL IP HOLDINGS (AUSTRALIA) PTY LIMITED, North Sydney (AU)

( * ) Notice: Subject to any disclaimer, the term of this patent is extended or adjusted under 35 U.S.C. 154(b) by 58 days.

(21) Appl. No.: 14/768,990

(22) PCT Filed: Dec. 23, 2014

(86) PCT No.: PCT/US2014/072142
§ 371 (c)(1),
(2) Date: Aug. 19, 2015

(87) PCT Pub. No.: WO2016/105383
PCT Pub. Date: Jun. 30, 2016

(65) Prior Publication Data
US 2016/0340247 A1    Nov. 24, 2016

(51) Int. Cl.
| | |
|---|---|
| *C04B 28/24* | (2006.01) |
| *C04B 28/30* | (2006.01) |
| *C04B 22/06* | (2006.01) |
| *C04B 28/06* | (2006.01) |
| *C04B 28/14* | (2006.01) |
| *C04B 28/18* | (2006.01) |
| *C04B 28/34* | (2006.01) |
| *C04B 9/00* | (2006.01) |
| *C04B 7/00* | (2006.01) |
| *C04B 7/34* | (2006.01) |
| *C04B 28/00* | (2006.01) |
| *C04B 32/00* | (2006.01) |

(52) U.S. Cl.
CPC ............ *C04B 22/064* (2013.01); *C04B 28/06* (2013.01); *C04B 28/065* (2013.01); *C04B 28/14* (2013.01); *C04B 28/188* (2013.01); *C04B 28/24* (2013.01); *C04B 28/30* (2013.01); *C04B 28/34* (2013.01); *Y02P 40/18* (2015.11)

(58) Field of Classification Search
CPC ........................................................ C04B 28/24
USPC ................................................ 106/801, 638
See application file for complete search history.

(56) References Cited

U.S. PATENT DOCUMENTS

| | | | |
|---|---|---|---|
| 4,033,782 A | 7/1977 | Ray et al. | |
| 5,624,489 A * | 4/1997 | Fu | ........................... C04B 28/06 106/692 |
| 6,641,658 B1 * | 11/2003 | Dubey | .................... C04B 28/16 106/695 |
| 8,088,217 B2 | 1/2012 | Francis | |
| 8,114,267 B2 | 2/2012 | Nordlinder et al. | |
| 8,177,909 B2 | 5/2012 | Constantz et al. | |
| 8,313,802 B2 | 11/2012 | Riman et al. | |
| 2007/0261947 A1 | 11/2007 | Gerlings et al. | |
| 2008/0282936 A1 * | 11/2008 | Morioka | ............... C04B 14/042 106/714 |
| 2011/0182799 A1 | 7/2011 | Riman et al. | |
| 2012/0312194 A1 * | 12/2012 | Riman | .................. C04B 28/182 106/706 |
| 2013/0122267 A1 | 5/2013 | Riman et al. | |
| 2013/0284069 A1 | 10/2013 | Dubey | |

(Continued)

FOREIGN PATENT DOCUMENTS

| | | | | |
|---|---|---|---|---|
| GB | 201608268 | * | 6/2016 | ........... C04B 18/021 |
| WO | 2013/049401 | | 4/2013 | |

OTHER PUBLICATIONS

SE 8206979 A, Jul. 9, 1984, Byfors et al. abstract only.*
Written Opinion issued in related International Application No. PCT/US2014/072142 dated Jul. 23, 2015.
International Search Report dated Jul. 23, 2015, in International Application No. PCT/US2014/072142 (4 pages).

*Primary Examiner* — James E McDonough
(74) *Attorney, Agent, or Firm* — Bookoff McAndrews, PLLC

(57) ABSTRACT

Cementitious compositions and methods for producing the cementitious compositions are described herein. The methods can include mixing a compound of the general formula $M_aSi_bX_cO_d$, $M_aSi_bX_cO_d(OH)_e$, $M_aSi_bX_c(OH)_e$, or $M_aSi_bX_c(OH)_e.(H_2O)_f$ wherein M comprises a metal that can react with carbon dioxide in a carbonation reaction to form a carbonate, Si forms an oxide during the carbonation reaction, X is an element other than M or Si, a, b, d, e, and f are greater than zero, and c is zero or greater, with a rapid setting hydraulic cement to produce a cementitious mixture. The methods can further include hydrating the cementitious mixture and carbonating the cementitious mixture. Carbonating the cementitious mixture can occur simultaneously with hydrating the cementitious mixture or subsequent to hydrating the cementitious mixture. In some embodiments, the non-hydraulic cement can comprise wollastonite. The hydraulic cement can be in an amount of from 5 wt % to 80 wt % of the cementitious composition.

20 Claims, No Drawings

(56) References Cited

U.S. PATENT DOCUMENTS

| | | | |
|---|---|---|---|
| 2013/0284070 A1 | 10/2013 | Dubey | |
| 2014/0238274 A1* | 8/2014 | Bullerjahn | C04B 28/04 106/692 |
| 2016/0031757 A1* | 2/2016 | Atakan | C04B 7/3453 106/640 |
| 2016/0096773 A1* | 4/2016 | Quinn | C04B 28/24 106/713 |

* cited by examiner

RAPID SETTING MATERIAL FOR IMPROVED PROCESSING AND PERFORMANCE OF CARBONATING METAL SILICATE CEMENT

FIELD OF THE DISCLOSURE

This disclosure relates generally to cementitious compositions, more particular, to the use of a rapid setting material in carbonating metal silicate cements.

BACKGROUND OF THE DISCLOSURE

Concrete is one of the most utilized man-made materials in the world. Concrete includes cement and an aggregate or filler. Cements can generally be classified as non-hydraulic and hydraulic. Typical non-hydraulic cements harden by carbonation in the presence of carbon dioxide in the air. Hydraulic cements such as Portland cement, on the other hand, harden through the hydration of silicates, oxides, aluminates, aluminoferrites, and sulfates present in the cement.

Non-hydraulic cements derived from the reaction between carbon dioxide and silicates such as magnesium silicate and calcium silicate have been an area of interest. For example, non-hydraulic cements absorb large amounts of carbon dioxide as they harden, making them an environmentally friendly choice for use in sustainable materials. However, diffusion of carbon dioxide and subsequent carbonation of a non-hydraulic cement may take for example, up to 18 hours before sufficient green strength develops in the composition. It is advantageous to be able to demold products comprising the non-hydraulic cement quickly and recycle the mold to production. This would mean that fewer molds would be required and that production rates could be increased. There is a continuing desire for cementitious compositions that are environmentally friendly and can provide rapid green strength.

SUMMARY OF THE DISCLOSURE

Cementitious compositions and methods for producing cementitious compositions are described herein. The cementitious composition can comprise a product formed by mixing a non-hydraulic cement with a rapid setting hydraulic cement to produce a cementitious mixture, hydrating the cementitious mixture, and carbonating the cementitious mixture. The non-hydraulic cement can include a compound of the general formula $M_aSi_bX_cO_d$, $M_aSi_bX_cO_d(OH)_e$, $M_aSi_bX_c(OH)_e$, or $M_aSi_bX_c(OH)_e \cdot (H_2O)_f$, wherein M comprises a metal that can react with carbon dioxide in a carbonation reaction to form a carbonate, Si forms an oxide during the carbonation reaction, and X includes an element other than M or Si, with a rapid setting hydraulic cement to produce a cementitious mixture. In some embodiments, a, b, d, e, and f are greater than zero and c is zero or greater. In some embodiments, M includes an alkaline earth metal such as calcium, magnesium, or a combination thereof. In some embodiments, the non-hydraulic cement can comprise wollastonite. In some embodiments, the cementitious mixture can also include $Ca(OH)_2$, for example, in the form of Portlandite.

The rapid setting hydraulic cement can include calcium aluminate cement (CAC), calcium phosphate cement, calcium sulfate hydrate, calcium aluminate sulfonated (CAS) cement, magnesium oxychloride (MOC) cement, magnesium oxysulfate (MOS) cement, magnesium phosphate cement, and combinations thereof. The hydraulic cement can be in an amount of from 5 wt % to 80 wt % of the cementitious composition.

In some embodiments, the cementitious composition has a compressive strength of about 1,000 lbs/in$^2$ in less than 15 minutes after hydration. In some embodiments, the cementitious composition has a compressive strength of about 2,000 lbs/in$^2$ in less than 60 minutes after hydration. Building materials comprising the cementitious composition are also disclosed. These can include a tile, a brick, a paver, a panel, a synthetic stone, or an underlay.

Methods of making the cementitious compositions are also described herein. The method includes mixing a compound of the general formula $M_aSi_bX_cO_d$, $M_aSi_bX_cO_d(OH)_e$, $M_aSi_bX_c(OH)_e$, or $M_aSi_bX_c(OH)_e \cdot (H_2O)_f$, and a rapid setting hydraulic cement to produce a cementitious mixture. The method further includes hydrating the cementitious mixture, and carbonating the cementitious mixture. The cementitious mixture can further include aggregate. In some embodiments, the cementitious mixture can further include $Ca(OH)_2$, for example, in the form of Portlandite. In some embodiments, the cementitious mixture can be carbonated using carbon dioxide dissolved in water. In some embodiments, carbonating the cementitious mixture occurs simultaneously with hydrating the cementitious mixture. Carbonating the cementitious mixture can occur simultaneously or subsequent to hydrating the cementitious mixture. For example, in some embodiments, carbonating the cementitious mixture occurs 15 minutes to 60 minutes after hydrating the cementitious mixture. In some embodiments, the cementitious composition may be removed from a mold before carbonating the cementitious mixture.

DESCRIPTION OF THE DISCLOSURE

Cementitious compositions and methods for producing cementitious compositions are described herein. The cementitious compositions can comprise a rapid setting hydraulic cement and a non-hydraulic cement.

"Rapid setting", as used herein, refers to a cement that can provide green strength to a cementitious composition. Green strength, as used herein, refers to the ability of the cementitious composition to be handled, for example, to be demolded, before it has completely cured without damage. Green strength allows the unhardened cementitious composition to keep its original shape until the composition completely cures, for example. The rapid setting cement can be a hydraulic cement. Hydraulic cement, as used herein, includes compositions that after combination with water, set and harden into cement, even in the presence of excess water. In some embodiments, a cementitious composition comprising the rapid setting cement can be handled within about 60 minutes or less, about 30 minutes or less, or about 15 minutes or less, of mixing the cementitious composition with water. The rapid setting hydraulic cement can include calcium aluminate cement (CAC), calcium phosphate cement, calcium sulfate hydrate, calcium aluminate sulfonate (CAS) cement, magnesium oxychloride (MOC) cement, magnesium oxysulfate (MOS) cement, magnesium phosphate cement, or a combination thereof.

In some embodiments, the rapid setting hydraulic cement can include CAC. CAC is also known in the art as "aluminous cement," "high-alumina cement," and "Ciment fondu." CAC is a unique class of cement that is different from ordinary portland cement (OPC), particularly due to its chemical make-up. CAC has a high alumina content, e.g., greater than 30 wt %. Higher purity CACs are also commercially available in which the alumina content can be as high as 80 wt %. Generally, several calcium aluminate compounds may be formed during the manufacturing process of CAC. The predominant compound formed often can be monocalcium aluminate ($CaO \cdot Al_2O_3$, also referred to as CA). Other calcium aluminate and calcium silicate may be formed, as well as compounds containing relatively high proportions of iron oxides, magnesia, titanic, sulfates, and alkalis. Some examples of CACs that can be used in the cementitious compositions are provided in Table 1 below. Other CAC compositions are known in the art and may be used in the present disclosure. CAC has a high early strength gain (upwards of 6,000 psi at 6 hours of age at 68° F.).

TABLE 1

Some examples of CAC and their compositions

| Grade | Color | $Al_2O_3$ | CaO | $SiO_2$ | $Fe_2O_3$ + FeO | $TiO_2$ | MgO | $Na_2O$ | $K_2O$ |
|---|---|---|---|---|---|---|---|---|---|
| Standard low alumina | Grey buff to black | 36-42 | 36-42 | 3-8 | 12-20 | <2 | ~1 | ~0.1 | ~0.15 |
| Low alumina, low iron | Light buff or grey to white | 48-60 | 36-42 | 3-8 | 1-3 | <2 | ~0.1 | ~0.1 | ~0.05 |
| Medium alumina | White | 35-75 | 25-35 | <0.5 | <0.5 | <0.05 | ~0.1 | <0.3 | ~0.05 |

In some embodiments, the rapid setting hydraulic cement can include calcium aluminate sulfonate (CAS) cement. CAS cements can have variable compositions, but all of them contain a significant fraction of Ye'elimite, also called Klein's salt or tetracalcium trialuminate sulfate. CAS can also have minor amounts of phases such as C2S, CA, C4AF, CS, CSH2, where C is CaO, S is $SiO_2$, A is $Al_2O_3$, F is $Fe_2O_3$, S is $SO_3$, M is MgO, T is $TiO_2$ and H is $H_2O$. CAS has a high early strength gain (upwards of 3,400 psi at 4 hours of age at 68° F.).

The rapid setting cement can include calcium fluoroaluminate (CFA) cement. CFA can have the chemical formula $11CaO \cdot 7Al_2O_3 \cdot CaF_2$. CFA cement has a high early strength gain (upwards of 1000 psi at 1.5 hours of age). Further, CFA cement can obtain its green strength at an ambient temperature of −9.4°C. (15° F.). Thus, CFA can be used in cold weather.

The rapid setting cement can include calcium sulfate based cements. Different morphological forms of calcium sulfate can be used in various embodiments of the cementitious compositions. Suitable examples of rapid setting calcium sulfate cements include calcium sulfate dihydrate (gypsum), calcium sulfate hemihydrate (stucco), and anhydrous calcium sulfate (sometimes called calcium sulfate anhydrite). These calcium sulfate cements can be from naturally available sources or produced industrially.

In some embodiments, the rapid setting cement can include calcium sulfate hemihydrate (also referred to herein as stucco). Stucco can be made from flue gas desulfurization—a byproduct of coal combustion. Stucco reacts very rapidly to form large crystals that could provide an internal structure or skeleton that will provide green strength. Stucco can set very rapidly, i.e., in less than about 5 minutes. Stucco has a high early strength gain (upwards of about 1000 psi at 3 hours of age at 68° F.).

The rapid setting cement can also include calcium phosphate cement (CPC). CPC consist of one or more calcium orthophosphate powders, which upon mixing with water or an aqueous solution, form a paste that is able to set and harden primarily as hydroxyapatite. CPA cement has a high early strength gain.

The rapid setting cement can also include magnesium oxychloride (MOC). MOC cement is also known in the art as "Sorel" or "magnesite". MOC cement is formed from a magnesium oxide and magnesium chloride solution. The MOC cement can comprise $Mg(OH)_2$, $Mg_2(OH)_3Cl \cdot 4H_2O$, $Mg_3(OH)_5Cl \cdot 4H_2O$ as the main bonding phases. Magnesium oxychloride cement can bond to a variety of inorganic and organic aggregates and has a high early strength.

The rapid setting cement can also include magnesium oxysulphate (MOS). MOS cement is formed from magnesium oxide and magnesium sulfate solution. The MOS cement can include four oxysulfate phases at temperatures between 30 and 120° C.: $5Mg(OH)_2MgSO_4 \cdot 3H_2O$ (5-form), $3Mg(OH)_2MgSO_4 \cdot 8H_2O$ (3-form), $Mg(OH)_2 \cdot MgSO_4 \cdot 5H_2O$, and $Mg(OH)_2 \cdot 2MgSO_4 \cdot 3H_2O$. MOS cement has a high early strength gain.

The rapid setting cement can also include magnesium phosphate cement. Magnesium phosphate cement is a mixture of magnesium oxide and phosphoric acid, which forms water-soluble magnesium dihydrogen phosphate [$Mg(H_2PO_4)_2 \cdot nH_2O$] as a reaction product. Dead burned magnesium oxide is used as the basic component, whereas ammonium phosphates are the preferred acidic component, as either diammonium hydrogen phosphates (($NH_4)_2HPO_4$) or ammonium dihydrogen phosphate ($NH_4H_2PO_4$). Magnesium phosphate cement has a high early strength gain (upwards of 4,000 psi at 60 minutes and up to about 7,000 psi at 120 minutes, at 68° F.).

The rapid setting cement can be a blend of two or more rapid setting cements discussed herein. The blend can modify the set times and green strength of the cementitious compositions relative to those embodiments using predominately or all of a single type of rapid setting cement.

The rapid setting cement can be present in the cementitious composition in amounts from 5% to 80% by weight of the cementitious composition. For example, the rapid setting cement can be included in an amount of 10 to 75 wt %, 15 to 70 wt %, or 20 to 60 wt %, based on the weight of the cementitious composition. In some embodiments, the rapid setting cement can be present in the cementitious composition in an amount of 5 wt % or greater, 10 wt % or greater, 15 wt % or greater, 20 wt % or greater, 25 wt % or greater, 30 wt % or greater, 35 wt % or greater, 40 wt % or greater, 45 wt % or greater, 50 wt % or greater, or 60 wt % or greater, based on the weight of the cementitious composition. In some embodiments, the rapid setting cement can be present in the cementitious composition in an amount of 80 wt % or less, 70 wt % or less, 60 wt % or less, 55 wt % or less, 50 wt % or less, 45 wt % or less, 35 wt % or less, 25 wt % or less, 20 wt % or less, or 15 wt % or less, based on the weight of the cementitious composition.

The cementitious compositions can also comprise a non-hydraulic cement. In some embodiments, the non-hydraulic cement can include a compound having the general formula $M_aSi_bX_cO_d$, $M_aSi_bX_cO_d(OH)_e$, $M_aSi_bX_c(OH)_e$, or $M_aSi_bX_c(OH)_e.(H_2O)_f$, wherein M includes a metal that can react to form a carbonate, Si forms an oxide during the carbonation reaction, and X includes an element other than M or Si. In some embodiments, a, b, d, e, and f are greater than zero and c is zero or greater. In some embodiments, M can include an alkaline earth metal, such as calcium or magnesium, an alkali metal such as sodium, and combinations thereof. In some embodiments, X can include sodium, aluminum, iron, hydrogen, boron, titanium, potassium, vanadium, tungsten, molybdenum, gallium, manganese, zirconium, germanium, copper, niobium, cobalt, indium, sulfur, phosphorous, and combinations thereof. In some embodiments, the ratio of a:b can be from 2.5:1 to 0.167:1. In some embodiments, d can be 3 or greater. In some embodiments, e can be 1 or greater.

In some embodiments, the non-hydraulic cement include a compound from the wollastonite group ($CaSiO_3$). In some embodiments, the non-hydraulic cement can include oshagite ($Ca_4(Si_3O_9)(OH)_2$), hillebrandite ($Ca_2(SiO_3)(OH)_2$), nekoite ($Ca_3Si_6O_{15}.7H_2O$), okenite ($Ca_3Si_6O_{15}.6H_2O$), pectolite ($Ca_2NaHSi_3O_9$), xonotlite ($Ca_6Si_6O_{17}(OH)_2$), clinotobermorite c ($Ca_5Si_6O_{17}.5H_2O$), clinotobermorite d ($Ca_5Si_6O_{17}.5H_2O$), clinotobermorite 9 Å'c ($Ca_5Si_6O_{16}(OH)_2$), clinotobermorite 9 Å'd ($Ca_5Si_6O_{16}(OH)_2$), oyelite ($Ca_{10}B_2Si_8O_{29}.12.5H_2O$), 9 Å tobermorite (riversideite) c ($Ca_5Si_6O_{16}(OH)_2$), 9 Å tobermorite (riversideite) d ($Ca_5Si_6O_{16}(OH)_2$), anomalous 11 Å tobermorite c ($Ca_4Si_6O_{15}(OH)_2.5H_2O$), anomalous 11 Å tobermorite d ($Ca_4Si_6O_{15}(OH)_2.5H_2O$), normal 11 Å tobermorite d ($Ca_{4.5}Si_6O_{16}(OH).5H_2O$), 14 Å tobermorite (plombierite) c ($Ca_5Si_6O_{16}(OH)_2.7H_2O$), 14 Å tobermorite (plombierite) d ($Ca_5Si_6O_{16}(OH)_2.7H_2O$), jennite ($Ca_9Si_6O_{18}(OH)_6.8H_2O$), metajennite ($Ca_9Si_6O_{18}(OH)_6.8H_2O$), fedorite (($Na,K)_2(Ca,Na)_7(Si,Al)_{16}O_{38}(F,OH)_2.3.5H_2O$), gyrolite ($NaCa_{16}Si_{23}AlO_{60}(OH)_8.14H_2O$), K-phase ($Ca_7Si_{16}O_{38}(OH)_2$), reyerite ($Na_2Ca_{14}Si_{22}Al_2O_{58}(OH)_8.6H_2O$), truscottite ($Ca_{14}Si_{24}O_{58}(OH)_8.2H_2O$), Z-phase ($Ca_9Si_{16}O_{40}(OH)_2.14H_2O$), calcium chondrodite g ($Ca_5[SiO_4]_2(OH)_2$), kilchoanite ($Ca_6(SiO_4)(Si_3O_{10})$), afwillite ($Ca_3(SiO_3OH)_2.2H_2O$ α-$C_2SH$ $Ca_2(HSiO_4)(OH)$), cuspidine h ($Ca_4(F_{1.5}(OH)_{0.5})Si_2O_7$), dellaite ($Ca_6(Si_2O_7)(SiO_4)(OH)$), jaffeite ($Ca_6[Si_2O_7](OH)_6$), killalaite ($Ca_{6.4}(H_{0.6}Si_2O_7)_2(OH)_2$), poldervaartite i ($Ca(Ca_{0.67}Mn_{0.33})(HSiO_4)(OH)$), rosenhahnite ($Ca_3Si_3O_8(OH)_2$), suolunite ($CaSiO_{2.5}(OH)_{.0.5}H_2O$), tilleyite ($Ca_5Si_2O_7(CO_3)_2$), bicchulite ($Ca_2(Al_2SiO_6)(OH)_2$), fukalite ($Ca_4(Si_2O_6)(CO_3)(OH)_2$), katoite hydrogarnet ($Ca_{1.46}AlSi_{0.55}O_6H_{3.78}$), rustumite ($Ca_{10}(Si_2O_7)_2(SiO_4)Cl_2(OH)_2$), scawtitem ($Ca_7(Si_6O_{18})(CO_3).2H_2O$), stratlingite ($Ca_2Al_2(SiO_2)(OH)_{10}.2.25H_2O$), forsterite ($Mg_2(SiO_4)$), andradite ($Ca_3Fe^{3+}_2(SiO_4)_3$), grossular ($Ca_3Al_2(SiO_4)_3$), pyrope ($Mg_3Al_2(SiO_4)_3$), olivine (($Mg,Fe^{2+})_2(SiO_4)$), sphene/titanite ($CaTiSiO_5$), larnite ($Ca_2SiO_4$), hatrurite (alite) ($Ca_3SiO_5$), danburite ($CaB_2(SiO_4)_2$), augite (($Ca,Na)(Mg,Fe,Al,Ti)(Si,Al)_2O_6$), diopside ($CaMg(Si_2O_6)$), enstatite ($Mg_2Si_2O_6$), hedenbergite ($CaFe^{2+}Si_2O_6$), hypersthene ($MgFe^{2+}Si_2O_6$), rhodonite (($Mn^{2+},Fe^{2+},Mg,Ca)SiO_3$), wollastonite 1A ($CaSiO_3$), cordierite (($Mg,Fe)_2Al_4Si_5O_{18}$), osumilite-(Mg) (($K,Na)(Mg,Fe^{2+})_2(Al,Fe^{3+})_3(Si,Al)_{12}O_{30}$), osumilite-(Fe) (($K,Na)(Mg,Fe^{2+})_2(Al,Fe^{3+})_3(Si,Al)_{12}O_{30}$), pseudo-wollastonite ($Ca_3Si_3O_9$), andesine (($Na,Ca)(Si,Al)_4O_8$), anorthite ($CaAl_2Si_2O_8$), bytownite (($Na,Ca)(Si,Al)_4O_8$), labradorite (($Na,Ca)(Si,Al)_4O_8$), and oligoclase (($Na,Ca)(Si,Al)_4O_8$). In some embodiments, the non-hydraulic cement includes wollastonite. The non-hydraulic cement can be naturally occurring or synthetically derived.

In some embodiments, the cementitious composition can include a compound having the formula $Ca(OH)_2$. For example, the non-hydraulic cement can include Portlandite. In some embodiments, the non-hydraulic cement can include a combination of $Ca(OH)_2$ and a compound of the formula $M_aSi_bX_cO_d$, $M_aSi_bX_cO_d(OH)_e$, $M_aSi_bX_c(OH)_e$, $M_aSi_bX_c(OH)_e.(H_2O)_f$, or mixtures thereof.

The non-hydraulic cement can be present in the cementitious composition in amounts from 20% to 95% by weight of the cementitious composition. For example, the non-hydraulic cement can be included in an amount of 25 to 90 wt %, 30 to 85 wt %, or 40 to 80 wt %, based on the weight of the cementitious composition. In some embodiments, the non-hydraulic cement can be present in the cementitious composition in an amount of 20 wt % or greater, 25 wt % or greater, 30 wt % or greater, 35 wt % or greater, 40 wt % or greater, 45 wt % or greater, 50 wt % or greater, or 60 wt % or greater, based on the weight of the cementitious composition. In some embodiments, the non-hydraulic cement can be present in the cementitious composition in an amount of 95 wt % or less, 90 wt % or less, 85 wt % or less, 80 wt % or less, 75 wt % or less, 70 wt % or less, 60 wt % or less, 55 wt % or less, 50 wt % or less, 45 wt % or less, 35 wt % or less, or 25 wt % or less, based on the weight of the cementitious composition.

In some embodiments, the weight ratio of the rapid setting cement to the non-hydraulic cement in the cementitious composition can be 4:1 to 1:20. For example, the ratio of the rapid setting cement to the non-hydraulic cement in the cementitious composition can be 2:1 to 1:15 or 1:1 to 1:10. In some embodiments, the ratio of the rapid setting cement to the non-hydraulic cement in the cementitious composition can be 1:20 or less, 1:15 or less, 1:10 or less, 1:5 or less, or 1:2 or less. In some embodiments, the ratio of the rapid setting cement to the non-hydraulic cement in the cementitious composition can be 2:1 or greater, 1:1 or greater, 1:3 or greater, 1:5 or greater, 1:10 or greater, or 1:15 or greater.

One or more aggregates or fillers can be further used in the cementitious compositions described herein. In some examples, the aggregate includes lightweight aggregate. Examples of suitable lightweight aggregate includes fly ash, bottom ash, expanded clay, expanded shale, expanded perlite, vermiculite, volcanic tuff, pumice, hollow ceramic spheres, hollow plastic spheres, expanded plastic beads (e.g., polystyrene beads), ground tire rubber, and mixtures of these. Further examples of suitable aggregates and fillers include other types of ash such as those produced by firing fuels including industrial gases, petroleum coke, petroleum products, municipal solid waste, paper sludge, wood, sawdust, refuse derived fuels, switchgrass, or other biomass material; ground/recycled glass (e.g., window or bottle glass); milled glass; glass spheres; glass flakes; activated carbon; calcium carbonate; aluminum trihydrate (ATH); silica; sand; alluvial sand; natural river sand; ground sand; crushed granite; crushed limestone; silica fume; slate dust; crusher fines; amorphous carbon (e.g., carbon black); clays (e.g., kaolin); alumina; granite; calcium oxide; calcium hydroxide; antimony trioxide; barium sulfate; magnesium oxide; titanium dioxide; zinc carbonate; zinc oxide; syenite; diatomite; pyrophillite; flue gas desulfurization (FGD) material; soda ash; trona; soy meal; pulverized foam; and mixtures thereof.

In some embodiments, inorganic fibers or organic fibers can be included in the inorganic polymer compositions, e.g., to provide increased strength. Fibers suitable for use with the cementitious compositions can include glass fibers, polyvinyl alcohol (PVA) fibers, polypropylene fibers, polyacrylonitrile fibers, polyester fibers, carbon fibers, basalt fibers, mineral fibers, and natural fibers (e.g., bamboo, jute, cellulose fibers, or coconut fibers). The fibers can be included in an amount of 0.1% to 10% based on the weight of cementitious compositions. For example, the fibers can be included in an amount of 0.5% to 8%, 0.75% to 6%, or 1% to 4% based on the weight of cementitious compositions. In some embodiments, the fibers are provided in an amount of 2% or less by weight, based on the weight of the cementitious composition including aggregate.

The aggregate or filler can be added to the composition at a weight ratio of 0.5:1 to 4:1 based on the weight of the non-hydraulic cement. In some embodiments, the aggregate to non-hydraulic cement weight ratio can be from 0.5:1 to 2.5:1 or from 1:1 to 2:1 depending on the product to be produced. In some embodiments, the aggregate to non-hydraulic cement weight ratio can be 0.5:1, 1:1, 1.5:1, 2:1, 2.5:1, 3:1, 3.5:1, or 4:1.

Pigments or dyes can optionally be added to the compositions described herein. An example of a pigment is iron oxide, which can be added in amounts ranging from 1 wt % to 7 wt % or 2 wt % to 6 wt %, based on the weight of cementitious composition.

The inclusion of aggregate or filler in the cementitious compositions described herein can modify and/or improve the chemical and mechanical properties of the compositions. For example, the optimization of various properties of the compositions allows their use in building materials and other structural applications. High aggregate and filler loading levels can be used in combination with the compositions without a substantial reduction of (and potentially an improvement in) the intrinsic structural and physical properties of the cementitious compositions. Further, the use of lightweight aggregate provides lightweight building products without compromising the mechanical properties of the cementitious compositions.

Methods for preparing the cementitious compositions are also described herein. Methods for providing early green strength to a non-hydraulic cement are also described. The setting and hardening properties of the cementitious composition can be derived from hydrating and carbonating the cementitious mixture. In some embodiments, the methods can include mixing the non-hydraulic cement with a rapid setting hydraulic cement to produce a cementitious mixture.

Mixing can be conducted in a mixing apparatus such as a high speed mixer or an extruder. The cementitious mixture can be mixed from 2 seconds to 30 minutes. In some examples, the cementitious mixture is mixed for a period of 15 seconds or less (e.g., 2 to 10 or 4 to 10 seconds). The mixing times, even in the order of 15 seconds or less, result in a homogenous mixture. In some embodiments, the cementitious mixture can be mixed for longer than 30 minutes.

The method of making the cementitious composition can further include hydrating the cementitious mixture and carbonating the cementitious mixture. The method may also include extruding the cementitious mixture into a mold, for example, in a shaping mold, compacting (including shaking or vibrating) the cementitious mixture, and allowing the cementitious mixture to set. The method can also include removing the cementitious mixture from a mold. The cementitious mixture can have a set time in the mold, for example, of from 1 to 300 minutes. In some embodiments, the set time of the cementitious composition and the time at which the cementitious composition can be remolded can be 60 minutes or less, 30 minutes or less, or 15 minutes or less.

Hydrating the cementitious mixture can include mixing water into the cementitious mixture and reaction of the hydraulic cement with the water. The amount of water added to the cementitious mixture during hydration depends on the needs of the individual materials present in the mixture. The weight ratio of water to hydraulic cement can be from 0.1:1 to 5:1, depending on the hydraulic cement being used and the method being used for producing the composition. The water present in the cementitious mixture can be a significantly more than the theoretical maximum uptake.

In some embodiments, hydrating the cementitious composition can be conducted at pH greater than 7. For example, the cementitious mixture can be hydrated at pH 7.5 or greater, pH 8 or greater, pH 8.5 or greater, or pH 9 or greater. In some embodiments, there can be local variations of the pH in the cementitious composition.

The cementitious mixture can be hydrated before extruding and/or compacting the cementitious mixture in the mold. In some embodiments, the cementitious mixture can be hydrated in the mold during or at least directly after compaction or both during and continuing after compaction.

The cementitious mixture can be combined with a water soluble material or an organic/solvent soluble material such as a wax that can facilitate the shaping of the cementitious mixture in the mold. The water or solvent soluble material can then be recovered when the cementitious composition is carbonated to create a designed or controlled void space in the composition.

The consistency of the cementitious mixture can range from wet cast concrete, which can be self-leveling with or without compaction or vibration, to dry cast concrete where compaction or vibration can be used for consolidation. An ultrasonic or mechanical vibrating device can be used for enhanced consolidation of the various components of the cementitious mixture in the mold. The vibrating device useful in the preparation of compositions described herein can be attached to or adjacent to an extruder and/or mixer. For example, the vibrating device can be attached to a die or nozzle or to the exit port of an extruder or mixer. Alternatively, the vibrating device can be attached to the mold to facilitate consolidation.

Carbonating the cementitious composition can include mixing carbon dioxide into the cementitious mixture to produce reaction of the non-hydraulic cement with the carbon dioxide. The source of carbon dioxide may be from any convenient source. The carbon dioxide can be provided as a solid (e.g., dry ice), liquid, or gas. In some embodiments, carbon dioxide can be provided from the air or from a gaseous carbon dioxide stream. In some embodiments, carbon dioxide can be provided as carbon dioxide dissolved in water. In some embodiments, the carbon dioxide used for carbonation can be sequestered from carbon dioxide waste streams or from a product of an industrial plant. Industrial plants that that produce carbon dioxide as a byproduct include power plants, chemical processing plants, steel mills, paper mills, cement plants, and other industrial plants. For example, carbon dioxide is produced during the production of flue gases from power plants or during combustion of fuels. The gaseous stream may be substantially pure carbon dioxide or a multi-component gaseous stream that includes carbon dioxide and one or more additional gases. In some embodiments, the carbon dioxide stream can include syngas, shifted syngas, natural gas, hydrogen, flue gases, and the like. In some embodiments, the carbon dioxide is provided as an alkaline solution charged with carbon dioxide.

In some embodiments, carbonating the cementitious composition can be conducted at pH less than 7. For example, the cementitious mixture can be carbonated at pH 6.5 or less, pH 6 or less, pH 5.5 or less, or pH 5 or less.

The amount of carbon dioxide added to the cementitious mixture during carbonation depends on the needs of the individual materials present in the mixture. In some embodiments, the carbon dioxide present in the cementitious mixture can be in an amount such that the molar ratio of carbon dioxide to the metal M (metal that can react to form a carbonate such as calcium) can be 1:1 to 5:1. For example, the molar ratio of carbon dioxide to metal M can be 5:1 or less, 4.5:1 or less, 4:1 or less, 3.5:1 or less, 3:1 or less, 2.5:1 or less, 2:1 or less, or 1.5:1 or less. In some embodiments, the molar ratio of carbon dioxide to metal M can be 1:1 or greater, 1.5:1 or greater, 2:1 or greater, 2.5:1 or greater, or 3:1 or greater. The carbon dioxide present in the cementitious mixture can be a significantly more than the theoretical maximum uptake.

In some embodiments, mixing the carbon dioxide into the cementitious composition occurs before the reaction of the carbon dioxide with the non-hydraulic cement. Mixing carbon dioxide into the cementitious mixture before the carbonation reaction can make the end product less porous. Carbon dioxide can be mixed into the cementitious mixture via injection. In some embodiments, carbon dioxide can be injected for 1 second to 120 seconds. For example, carbon dioxide can be injected for 120 seconds or less, 60 seconds or less, 50 seconds or less, 45 seconds or less, 30 seconds or less, 20 seconds or less, 15 seconds or less, or 10 seconds or less. In some embodiments, the carbon dioxide can be injected for 1 second or more, 5 seconds or more, 10 seconds or more, 15 seconds or more, 20 seconds or more, 25 seconds or more, 30 seconds or more, 45 seconds or more, or 60 seconds or more.

In some embodiments, carbonating the cementitious mixture can occur simultaneously with hydrating the cementitious mixture. For example, water and carbon dioxide can be provided in the cementitious mixture as a solution of carbon dioxide in water. In some embodiments, water and carbon dioxide can be added separately but simultaneously to the cementitious mixture.

In some embodiments, carbonating the cementitious mixture occurs subsequent to hydrating the cementitious mixture. For example, the cementitious mixture can be removed from the mold before carbonating the cementitious mixture. In some embodiments, carbonating the cementitious mixture can occur 5 minutes to 60 minutes after hydrating the cementitious mixture. In some embodiments, carbonating the cementitious mixture can occur 10 to 55 minutes or 15 to 45 minutes after hydrating the cementitious mixture.

Among other properties, the rate of strength development, setting behavior, and ultimate compressive strength, can be tailored by selecting an appropriate hydraulic cement. The desired properties of the cementitious composition may also depend on the particle size, crystal morphology, and treatment of the rapid setting cement. Thus, the selection of the type of rapid setting hydraulic cement used in the cementitious compositions can be based on the balance of properties desired in the end application of the cementitious compositions, including early demolding, product transfer, or other secondary processing, while keeping a sufficiently open network that would allow for good contact with carbon dioxide in solution or as a gas for curing.

As described herein, the particle size and morphology of the rapid setting cement can influence the development of green strength and ultimate strengths of the cementitious composition. Smaller particle size of the rapid setting cement may lead to more rapid development in green strength. In some embodiments, when it may be desirable to have an extremely rapid rate of strength development, the average particle size of rapid setting cement can be from 1 to 30 µm. For example, the average particle size of rapid setting cement can be 1 to 20 µm or 1 to 10 µm.

Similarly, an increase in the amount of rapid setting cement in the cementitious composition can also lead to more rapid development in green strength. For example, the hydraulic cement can be included in the cementitious composition in an amount of from 5 wt % to 80 wt % of the composition. One of ordinary skill in the art would know how to select the amount of rapid setting cement to be added to the cementitious mixture.

Rapid development and higher green strength can be an advantage for a cementitious composition because it can withstand higher stresses without excessive deformation. Further, higher green strength can also increase the factor of safety relating to handling and use of manufactured products. The rapid setting cement may cause the cementitious composition to develop green strength in 90 minutes or less, 60 or less, 45 minutes or less, 30 minutes or less, 15 minutes or less, 10 minutes or less, or 5 minutes or less. For example, the rapid setting cement may cause the cementitious composition to develop green strength in 30 minutes, 25 minutes, 20 minutes, 15 minutes, 10 minutes, or 5 minutes.

The green strength of the cementitious mixture can be characterized by measuring the compressive strength or the flexural strength of the cementitious composition. For example, green strength can be determined using stress-strain relations using a uniaxial compressive strength test as described by G. Hüsken, et al., *Cement and Concrete Research* 2012, 42:501-510. The compressive strength can be measured using the 'standard test for compressive strength of hydraulic cement mortars' as described by ASTM C109. The flexural strength can be measured using the 'standard test for flexural strength of hydraulic cement mortars' as described by ASTM C348. In some embodiments, the rapid setting hydraulic cement can have green strengths of 1,000 psi or greater, 1,500 psi or greater, 2,000 psi or greater, 2,500 psi or greater, 3,000 psi or greater, or 3,500 psi or greater, within about 90 minutes or less, about 60 minutes or less, about 30 minutes or less, about 15 minutes or less after hydration. For example, the rapid setting hydraulic cement can have green strengths of 1,000 psi or greater, 1,500 psi or greater, 2,000 psi or greater, 2,500 psi or greater, 3,000 psi or greater, or 3,500 psi or greater, within about 60 minutes or less after hydration.

In some embodiments, the cementitious composition has a compressive strength of at least 1,000 psi in less than 15 minutes after hydration. In some embodiments, the rapid setting hydraulic cement provides a compressive strength of 1,000 psi or greater or 1,500 psi or greater in less than 15 minutes after hydration. In some embodiments, the rapid setting hydraulic cement provides a compressive strength of at least 2,000 psi within 60 minutes after hydration. In some embodiments, the rapid setting hydraulic cement provides a compressive strength of 2,000 psi or greater, 2,500 psi or greater, 3,000 psi or greater, 3,500 psi or greater, or 4,000 psi or greater, within 60 minutes after hydration. In some embodiments, the compressive strength of the completely cured cementitious composition can be higher than that of a composition comprising the hydraulic cement alone or the non-hydraulic cement alone.

In some embodiments, the cementitious compositions are suitable for use in extremely cold climates. For example, the cementitious compositions disclosed can develop rapid green strength at reduced temperatures from 0° F. to 68° F. or from 10° F. to 32° F. In some embodiments, the cementitious compositions are suitable for use at elevated temperatures. For example, the cementitious compositions disclosed can develop rapid green strength at elevated temperatures such as 150° F. or greater, 175° F. or greater, or 200° F. or greater.

The methods of producing the cementitious compositions may suitable for use in repair work, such as road repair, where high green strengths may be desired. In some embodiments, the cementitious compositions can be formed into shaped articles and used in various applications, including building materials. Examples of such building materials include roofing tiles, ceramic tiles, architectural stone, thin bricks, bricks, hollow core planks, pavers, panels, underlay (e.g., bathroom underlay), banisters, lintels, pipe, posts, signs, guard rails, retaining walls, park benches, tables, railroad ties, cross arms for electrical poles, and other shaped articles.

The compositions and methods disclosed herein provide a superior microstructure with stronger bonds and better mechanical performance than Portland cement. In addition, the compositions and methods disclosed herein provide reduced $CO_2$ emittance and lower energy requirements as compared to Portland cement.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A method for producing a cementitious composition comprising:
   (i) mixing
      from 30 wt % to 85 wt %, based on the weight of the cementitious composition, of a compound of the general formula $M_aSi_bX_cO_d$, $M_aSi_bX_cO_d(OH)_e$, $M_aSi_bX_c(OH)_e$, or $M_aSi_bX_c(OH)_e(H_2O)_f$, wherein M comprises a metal that can react with carbon dioxide in a carbonation reaction to form a carbonate, Si forms an oxide during the carbonation reaction, X is an element other than M or Si, a, b, d, e, and f are greater than zero, and c is zero or greater with
      from 15 wt % to 70 wt %, based on the weight of the cementitious composition, of a rapid setting hydraulic cement to produce a cementitious mixture;
   (ii) hydrating the cementitious mixture to react the rapid setting hydraulic cement with water; and
   (iii) carbonating the cementitious mixture.

2. The method of claim 1, wherein M includes an alkaline earth metal selected from the group consisting of calcium, magnesium, sodium, or a combination thereof.

3. The method of claim 1, wherein the compound of general formula $M_aSi_bX_cO_d$ includes wollastonite.

4. The method of claim 1, wherein the rapid setting hydraulic cement includes a hydraulic cement selected from the group consisting of calcium aluminate cement (CAC), calcium phosphate cement, calcium sulfate hydrate, calcium aluminate sulfonate (CAS) cement, magnesium oxychloride cement, magnesium oxysulfate cement, magnesium phosphate cement, and combinations thereof.

5. The method of claim 1, wherein the hydraulic cement is in an amount of from 20 wt % to 70 wt % of the cementitious composition.

6. The method of claim 1, wherein carbonating the cementitious mixture occurs simultaneously with hydrating the cementitious mixture.

7. The method of claim 1, wherein carbonating the cementitious mixture occurs 15 minutes to 60 minutes after hydrating the cementitious mixture.

8. The method of claim 1, wherein the hydraulic cement provides a compressive strength of at least about 1,000 lbs/in$^2$ in less than 15 minutes after hydration.

9. The method of claim 1, wherein the hydraulic cement provides a compressive strength of at least about 2,000 lbs/in$^2$ in less than 60 minutes after hydration.

10. The method of claim 1, further comprising removing the cementitious mixture from a mold before carbonating the cementitious mixture.

11. The method of claim 1, wherein carbonating the cementitious mixture comprises using carbon dioxide dissolved in water.

12. The method of claim 1, further comprising mixing an aggregate in the cementitious mixture.

13. The method of claim 1, further comprising mixing $Ca(OH)_2$ in the cementitious mixture.

14. A cementitious product formed by:
   (i) mixing
      from 30 wt % to 85 wt %, based on the weight of the cementitious product, of a compound of the general formula $M_aSi_bX_cO_d$, $M_aSi_bX_cO_d(OH)_e$, $M_aSi_bX_c(OH)_e$, or $M_aSi_bX_c(OH)_e(H_2O)_f$, wherein M comprises a metal that can react with carbon dioxide in a carbonation reaction to form a carbonate, Si forms an oxide during the carbonation reaction, X is an element other than M or Si, a, b, d, e, and f are greater than zero, and c is zero or greater, with
      from 15 wt % to 70 wt %, based on the weight of the cementitious product of rapid setting hydraulic cement to produce a cementitious mixture;
   (ii) hydrating the cementitious mixture to react the rapid setting hydraulic cement with water; and
   (iii) carbonating the cementitious mixture.

15. The cementitious product of claim 14, wherein M is an alkaline earth metal selected from the group consisting of calcium, magnesium, and a combination thereof.

16. The cementitious product of claim 14, wherein the rapid setting hydraulic cement includes a hydraulic cement selected from the group consisting of calcium aluminate cement, calcium phosphate cement, calcium sulfate hydrate, calcium aluminate sulfonate cement, magnesium oxychloride cement, magnesium oxysulfate cement, magnesium phosphate cement, and combinations thereof.

17. The cementitious product of claim 14, wherein the hydraulic cement is in an amount of from 20 wt % to 70 wt % of the product.

18. The cementitious product of claim 14, wherein the cementitious product has a compressive strength of at least 1000 $lbs/in^2$.

19. The cementitious product of claim 14, wherein the cementitious mixture further comprises aggregate.

20. A building material comprising the cementitious product of claim 14, wherein the building material is selected from the group consisting of a tile, a brick, a paver, a panel, a synthetic stone, or an underlay.

\* \* \* \* \*